United States Patent
Lu et al.

(10) Patent No.: US 11,683,848 B2
(45) Date of Patent: Jun. 20, 2023

(54) CONNECTION CONTROL AND SERVICE PROCESSING METHODS AND DEVICES

(71) Applicant: ZTE Corporation, Shenzhen (CN)

(72) Inventors: Ting Lu, Shenzhen (CN); Yin Gao, Shenzhen (CN); Bo Dai, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 74 days.

(21) Appl. No.: 16/764,493

(22) PCT Filed: Nov. 16, 2018

(86) PCT No.: PCT/CN2018/115820
§ 371 (c)(1),
(2) Date: May 15, 2020

(87) PCT Pub. No.: WO2019/096236
PCT Pub. Date: May 23, 2019

(65) Prior Publication Data
US 2020/0359443 A1    Nov. 12, 2020

(30) Foreign Application Priority Data
Nov. 16, 2017   (CN) .......................... 201711138876.2

(51) Int. Cl.
*H04W 76/19* (2018.01)
*H04W 76/30* (2018.01)
*H04W 76/11* (2018.01)
*H04W 76/27* (2018.01)
(Continued)

(52) U.S. Cl.
CPC ............ *H04W 76/19* (2018.02); *H04W 76/11* (2018.02); *H04W 76/27* (2018.02); *H04W 76/30* (2018.02); *H04W 80/02* (2013.01); *H04W 80/08* (2013.01)

(58) Field of Classification Search
CPC ..... H04W 76/19; H04W 76/30; H04W 76/11; H04W 76/27; H04W 80/02; H04W 80/08; H04W 92/14
See application file for complete search history.

(56) References Cited

U.S. PATENT DOCUMENTS

| 2012/0077509 A1* | 3/2012 | Huang | ................. | H04W 76/19 455/450 |
| 2012/0243417 A1* | 9/2012 | Henttonen | ............ | H04W 76/27 370/241 |

(Continued)

FOREIGN PATENT DOCUMENTS

| CN | 103716837 A | 4/2014 |
| CN | 106105373 A | 11/2016 |

(Continued)

OTHER PUBLICATIONS

International Search Report for corresponding application PCT/CN2018/115820 filed Nov. 16, 2018; dated Feb. 22, 2019.

*Primary Examiner* — Will W Lin
(74) *Attorney, Agent, or Firm* — Cantor Colburn LLP

(57) ABSTRACT

The present disclosure discloses a connection control method, which includes that: a first network element receives an Up Link (UL) S1 message used for establishing or resuming an S1 interface related to User Equipment (UE) from a second network element; and the first network element sends a Downlink (DL) S1 message to the second network element, the DL S1 message including at least one of first indication information and second indication information. The present disclosure also discloses a connection control method and device, a service processing method and device, a processor and a storage medium.

20 Claims, 10 Drawing Sheets

(51) Int. Cl.
*H04W 80/02* (2009.01)
*H04W 80/08* (2009.01)

(56) References Cited

U.S. PATENT DOCUMENTS

| | | | |
|---|---|---|---|
| 2012/0312950 A1 | 12/2012 | Sears | |
| 2015/0103766 A1* | 4/2015 | Miklos | H04W 76/20 |
| | | | 370/329 |
| 2015/0172964 A1* | 6/2015 | Huang | H04W 76/30 |
| | | | 455/437 |
| 2015/0312822 A1* | 10/2015 | Bangolae | H04W 36/08 |
| | | | 370/331 |
| 2016/0113057 A1* | 4/2016 | Han | H04W 4/70 |
| | | | 370/328 |
| 2016/0234872 A1* | 8/2016 | Liu | H04W 48/18 |
| 2016/0242084 A1 | 8/2016 | Campbell | |
| 2017/0223755 A1* | 8/2017 | Lin | H04W 74/0833 |
| 2017/0332419 A1* | 11/2017 | Kim | H04L 1/1861 |
| 2018/0213452 A1* | 7/2018 | Kim | H04L 5/0091 |
| 2018/0302947 A1* | 10/2018 | Yan | H04L 5/0055 |
| 2019/0090099 A1* | 3/2019 | Wang | H04W 76/11 |
| 2019/0230667 A1* | 7/2019 | Loehr | H04W 8/02 |
| 2020/0022207 A1* | 1/2020 | Yu | H04W 76/15 |
| 2020/0252853 A1* | 8/2020 | Shi | H04W 48/12 |
| 2021/0297909 A1* | 9/2021 | Lee | H04W 74/0833 |

FOREIGN PATENT DOCUMENTS

| | | |
|---|---|---|
| CN | 106792936 A | 5/2017 |
| CN | 107046714 A | 8/2017 |
| CN | 107221271 A | 9/2017 |

* cited by examiner

CONNECTION CONTROL AND SERVICE PROCESSING METHODS AND DEVICES

CROSS-REFERENCE TO RELATED APPLICATIONS

The present application claims priority to Chinese Patent Application No. 201711138876.2, submitted to the China National Intellectual Property Administration on Nov. 16, 2017, the entire contents of which are incorporated herein by reference.

TECHNICAL FIELD

The present disclosure relates to the field of communications, and for example, to connection control and service processing methods and devices.

BACKGROUND

In a Machine to Machine (M2M) communication system, energy conservation of User Equipment (UE) is of vital importance. In a related art, when UE is in a Radio Resource Control_IDLE (RRC_IDLE) state and has data to be sent, the UE triggers a random access process to establish or resume an RRC connection with a network at first, the UE may send the data to a base station in an RRC connection establishment completion message or an RRC resume completion message at the earliest, and then the UE is kept in an RRC_CONNECTED state for a while and waits to be released by the base station. When the UE is in the RRC_CONNECTED state and has data to be sent, the UE may initiate random access at first because of time asynchrony or absence of Up Link (UL) resources and, after a random access process is completed, contain the data in a fifth message Msg5 (i.e., an RRC establishment or reestablishment completion message returned to the base station by the UE) or a UL air interface message after the Msg5 for sending to the base station.

An Evolved Node Base Station (eNB), after receiving an air interface message containing UL data, triggers an S1 interface flow to send data to a core. In the related art, for example, for a Control Plane (CP) solution, the S1 interface flow is shown in FIG. 1. FIG. 1 is a diagram of an S1 interface flow according to the related art.

According to the CP solution, in a Non-Access Stratum Protocol Data Unit (NAS PDU) transmission flow, UE may include Release Assistance Information (RAI) in a UL NAS PDU to indicate whether the UE has remaining UL data or expects Downlink (DL) data. If the RAI indicates that the UE expects DL data (for example, an acknowledgement of an application layer for the UL NAS PDU), it may mean that a DL data packet sent after the RAI is a last data packet for present data exchange of the application layer. The UE sends the UL NAS PDU to an eNB through an air interface message, and the eNB, after receiving the air interface message containing the UL NAS PDU, may send an S1 Application Protocol (S1-AP) initial UE message to a Mobility Management Entity (MME), Identification (ID) information (for example, an eNB UE S1-AP ID) required by establishment of a logical S1 connection related to the UE by the eNB being included and the UL NAS PDU being contained in the S1-AP initial UE message.

The MME, after receiving a UL S1 message including the UL NAS PDU, may forward the UL NAS PDU to a core. If the MME judges according to the RAI that the UE expects no DL data, and the MME has no cached DL data and there is no S1-User Plane (UP) (S1-U) interface, then, the MME may send a connection establishment indication message to the eNB. The connection establishment indication message includes ID information (for example, an MME UE S1-AP ID) required by a logical S1 connection related to the UE and configured to complete establishment of an S1 interface related to the UE. The connection establishment indication message sent to the eNB may further contain UE capability information. Then, the MME may immediately send a UE context release command to trigger connection release. If the MME judges, according to the RAI, that the UE expects the DL data, the MME, after receiving DL data sent by a Packet Data Network Gateway (P-GW), may include the data in a DL NAS PDU so as to send the data to the eNB through a DL NAS transport message. If the MME also has cached DL data, the DL data may be included in the DL NAS PDU together with the DL data sent by the P-GW. If the MME judges, according to the RAI, that there is no more DL data and the MME has no more cached data, the MME may also immediately send the UE context release command to trigger connection release.

The eNB, after receiving the DL NAS transport message, may trigger an air-interface-based DL data sending flow. If the eNB receives the UE context release command, the eNB may trigger an RRC connection release flow to release the UE from the RRC_CONNECTED state to the RRC_IDLE state.

There is also proposed an optimal service data sending method in the related art. FIG. 2 is a flowchart of a service data sending method according to the related art. In the following random access flow, UE transmits UL data through a third message Msg3 (i.e., an RRC establishment request or reestablishment request sent by the UE), and if the UE receives a contention resolution ID contained in a fourth message Msg4 (i.e., an RRC establishment or reestablishment command sent to the UE by the eNB) and judges that contention resolution succeeds, the UE determines that the UL data is successfully sent and there is no need for the UE to be switched to an RRC_CONNECTED state, and therefore the UE stays in an RRC_IDLE state. This flow may be called an Early Data Transmission (EDT) flow.

In the EDT flow, the UE may include the UL data in the air interface message Msg3 for sending to the eNB, and the UE may determine whether to be kept in the RRC_IDLE state or switched to the RRC_CONNECTED state according to the Msg4 sent by the eNB.

In the related art, a specific principle based on which an eNB selects different Msg4 to switch UE to an RRC_CONNECTED state or keep the UE in an RRC_IDLE state is not yet determined.

SUMMARY

Embodiments of the present disclosure provide connection control and service processing methods and devices, to at least provide a method for indicating a second network element through an S1 interface message.

According to an embodiment of the present disclosure, a connection control method is provided, which may include that: a first network element receives a UL S1 message used for establishing or resuming an S1 interface related to UE from a second network element; and the first network element sends a DL S1 message to the second network element, the DL S1 message including at least one of first indication information and second indication information.

According to an embodiment of the present disclosure, another connection control method is provided, which may include that: a second network element receives at least one of first indication information and second indication information from a first network element, or, the second network element receives UP data and at least one of the first indication information and the second indication information from a third network element; and the second network element releases or suspends an S1 interface related to UE according to the received indication information, or, the second network element releases all or part of Evolved Radio Access Bearers (E-RABs) according to the received indication information.

According to an embodiment of the present disclosure, a service processing method is provided, which may include that: a first network element receives a lower-layer PDU sent by UE to enable a lower protocol layer of the first network element to transmit a PDU from a first logical channel and a PDU from a second logical channel to a higher protocol layer of the first network element, the higher protocol layer processes the PDU from the first logical channel and acquires or resumes dedicated configuration information of the UE according to ID information in the PDU of the first logical channel, the higher protocol layer transmits the dedicated configuration information and the PDU of the second logical channel to the lower protocol layer, and the lower protocol layer processes the PDU of the second logical channel according to the dedicated configuration information and transmits a processing result to the higher protocol layer; or, the first network element receives the lower-layer PDU sent by the UE to enable the lower protocol layer of the first network element to transmit the PDU from the first logical channel to the higher protocol layer of the first network element and the lower protocol layer to cache the PDU from the second logical channel, the higher protocol layer processes the PDU from the first logical channel and acquires or resumes the dedicated configuration information of the UE according to the ID information in the PDU of the first logical channel, the higher protocol layer transmits the dedicated configuration information to the lower protocol layer, and the lower protocol layer processes the cached PDU of the second logical channel according to the dedicated configuration information and transmits the processing result to the higher protocol layer.

According to another embodiment of the present disclosure, a connection control device is provided, which may be applied to a first network element and include: a receiving module, configured to receive a UL S1 message used for establishing or resuming an S1 interface related to UE from a second network element; and a sending module, configured to send a DL S1 message to the second network element, the DL S1 message including at least one of first indication information and second indication information.

According to another embodiment of the present disclosure, another connection control device is provided, which may be applied to a second network element and include: a receiving module, configured to receive at least one of first indication information and second indication information from a first network element or receive UP data and at least one of the first indication information and the second indication information from a third network element; and a processing module, configured to release or suspend an S1 interface related to UE according to the received indication information or release all or part of E-RABs according to the received indication information.

According to another embodiment of the present disclosure, a service processing device is provided, which may be applied to a first network element and include: a receiving module, configured to receive a lower-layer PDU sent by UE, a lower protocol layer of the first network element, configured to transmit a PDU from a first logical channel and a PDU from a second logical channel to a higher protocol layer of the first network element, and the higher protocol layer, configured to process the PDU from the first logical channel, acquire or resume dedicated configuration information of the UE according to ID information in the PDU of the first logical channel and transmit the dedicated configuration information and the PDU of the second logical channel to the lower protocol layer, the lower protocol layer being further configured to process the PDU of the second logical channel according to the dedicated configuration information and transmit a processing result to the higher protocol layer; or, the receiving module, configured to receive the lower-layer PDU sent by the UE, the lower protocol layer of the first network element, configured to transmit the PDU from the first logical channel to the higher protocol layer of the first network element and cache the PDU from the second logical channel, and the higher protocol layer, configured to process the PDU from the first logical channel, acquire or resume the dedicated configuration information of the UE according to the ID information in the PDU of the first logical channel and transmit the dedicated configuration information to the lower protocol layer, the lower protocol layer being further configured to process the cached PDU of the second logical channel according to the dedicated configuration information and transmit the processing result to the higher protocol layer.

According to another embodiment of the present disclosure, a storage medium is also provided, which may include a stored program, the program, when running, executes the above-mentioned methods.

According to another embodiment of the present disclosure, a processor is also provided, which may be configured to run a program, the program, when running, executes the above-mentioned methods.

DETAILED DESCRIPTION OF THE EMBODIMENTS

The present disclosure will be described below with reference to the drawings and in combination with the embodiments. The embodiments in the present disclosure and characteristics in the embodiments may be combined without conflicts.

Terms like "first" and "second" in the specification, claims and accompanying drawings of the present disclosure are used for differentiating the similar objects, but do not have to describe a specific order or a sequence.

First Embodiment

Figure 1:
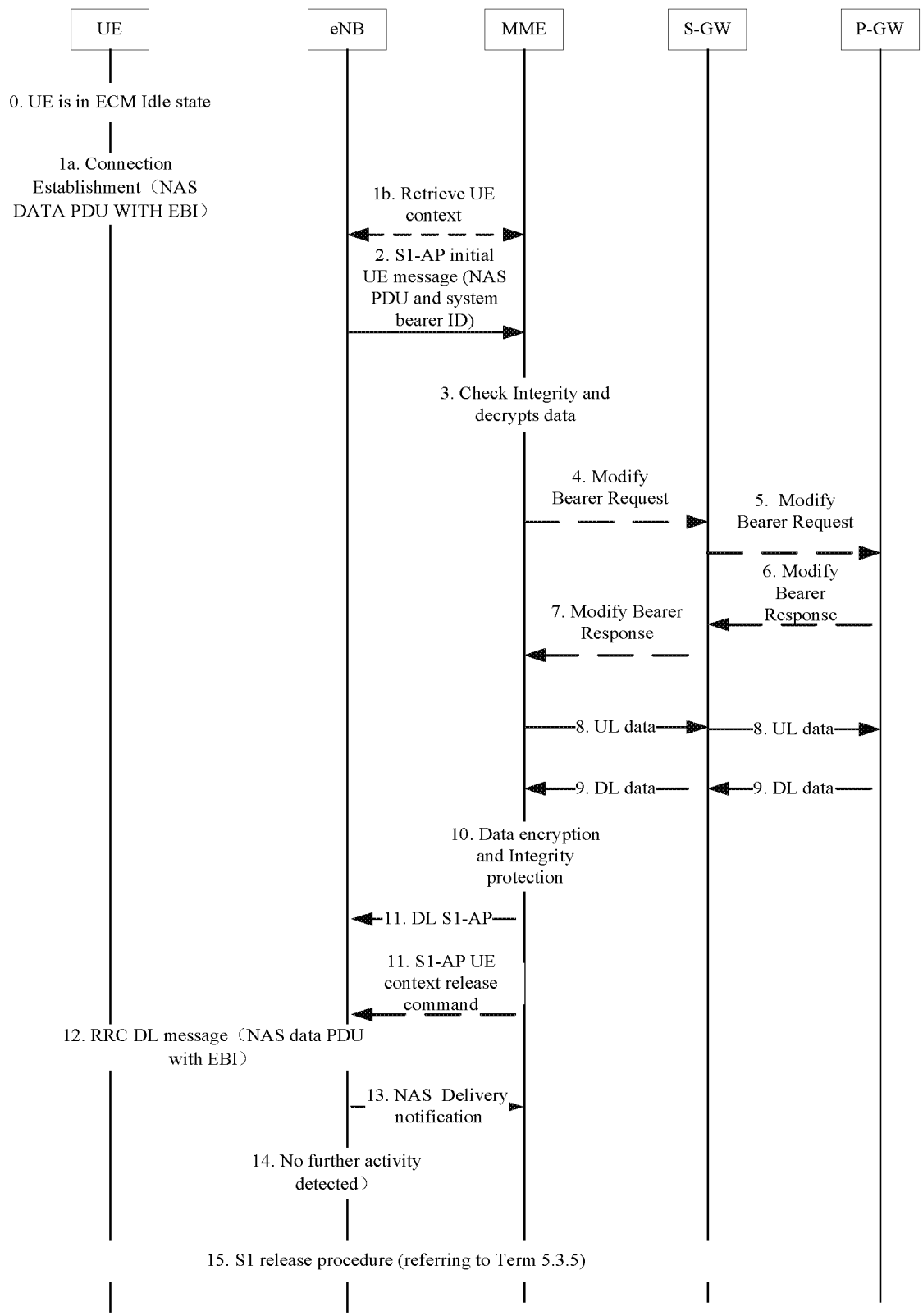
FIG. 1 is a diagram of an S1 interface flow according to the related art.
Figure 2:
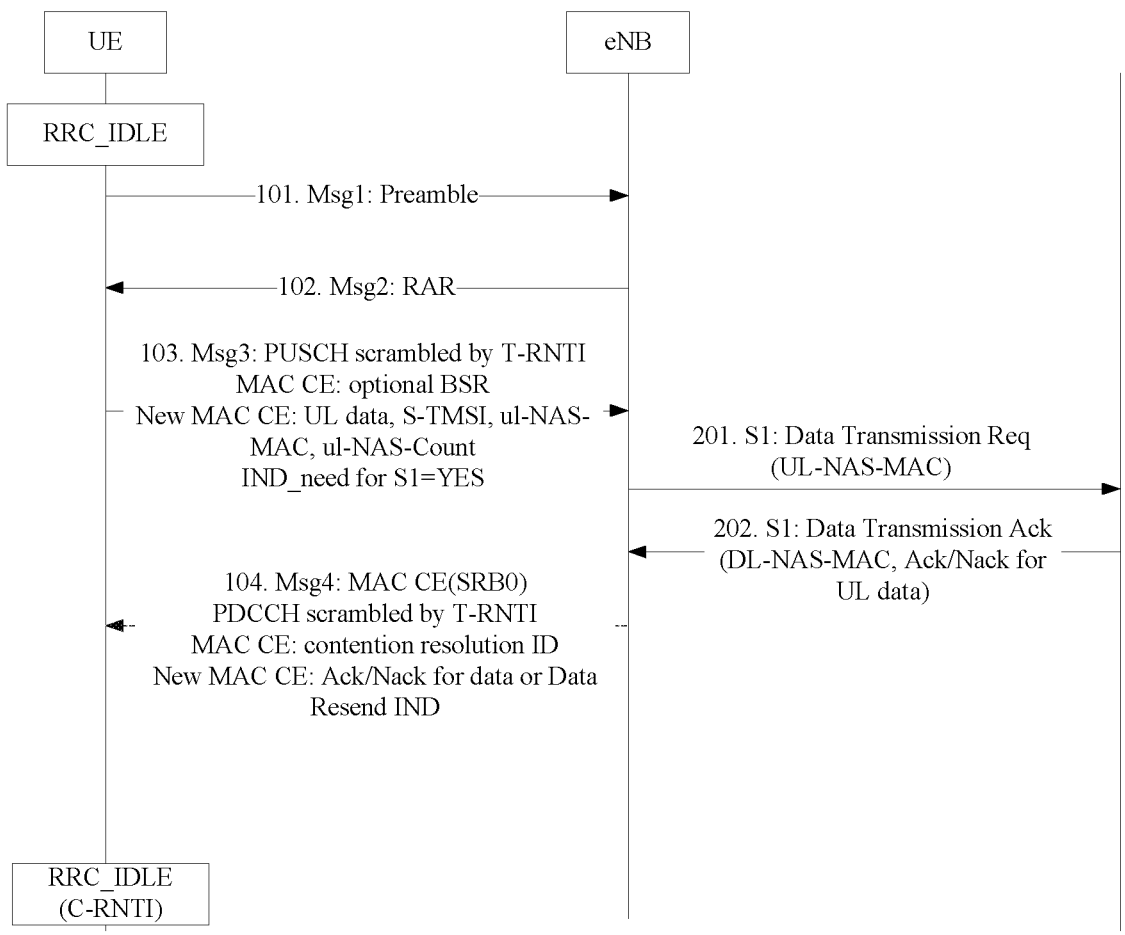
FIG. 2 is a flowchart of a service data sending method according to the related art.
Figure 3:
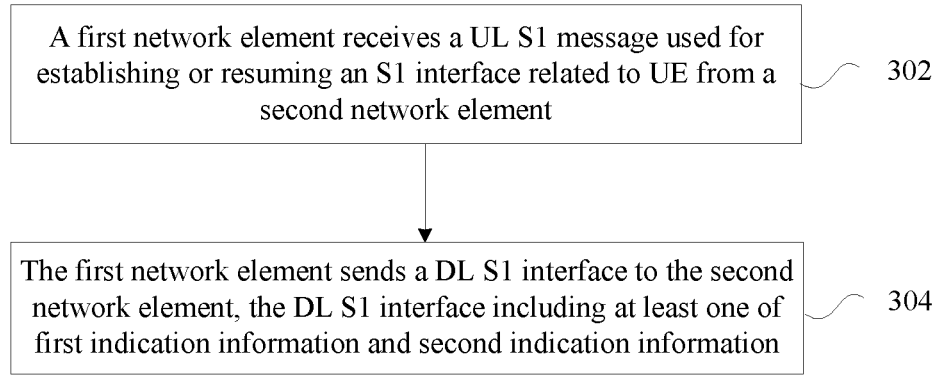
FIG. 3 is a flowchart of a connection control method according to an embodiment of the present disclosure.

The embodiment provides a connection control method. FIG. 3 is a flowchart of a connection control method according to an embodiment of the present disclosure. As shown in FIG. 3, the flow includes the following operations.

In operation 302, a first network element receives a UL S1 message used for establishing or resuming an S1 interface related to UE from a second network element.

In operation 304, the first network element sends a DL S1 interface to the second network element, where the DL S1 interface includes at least one of first indication information and second indication information.

Through the operations, the first network element, after receiving the UL S1 interface used for establishing or resuming the S1 interface related to the UE from the second network element, sends the indication information to the second network element, and a method for indicating the second network element through an S1 message is provided as follows.

In an embodiment, the second network element is in one of the following states: an RRC_IDLE state and an RRC_INACTIVE state.

In an embodiment, the first indication information is used for indicating a data state of the UE to the second network element, and the first indication information includes at least one of an end marker data packet, whether a core has cached DL data of the UE, and whether the core has the cached DL data of the UE in a set time length.

In an embodiment, the first indication information is further used for indicating whether the second network element is allowed to actively initiate S1 connection release or suspension, or whether the second network element is allowed to release all or part of E-RABs.

In an embodiment, the second indication information is used for indicating whether the second network element is allowed to actively initiate S1 connection release or suspension, or whether the second network element is allowed to release all or part of the E-RABs.

In an embodiment, the DL S1 message includes related information of the S1 interface, and the related information of the S1 interface includes an S1 interface ID of the UE on a first network element side and an S1 interface ID of the UE on a second network element side.

In an embodiment, the first indication information includes a waiting timer, and the first indication information is used for indicating the second network element to release or suspend the S1 interface related to the UE after the first indication information is received and a set time length of the waiting timer is exceeded.

In an embodiment, the set time length of the waiting timer is more than or equal to 0.

In an embodiment, after it is indicated that the second network element may release or suspend the S1 interface related to the UE, the connection control method further includes that: after the set time length of the waiting timer is exceeded, the S1 interface related to the UE is released or suspended, or all or part of the E-RABs are released.

In an embodiment, the first network element is an MME, and the second network element is an access network.

Figure 4:
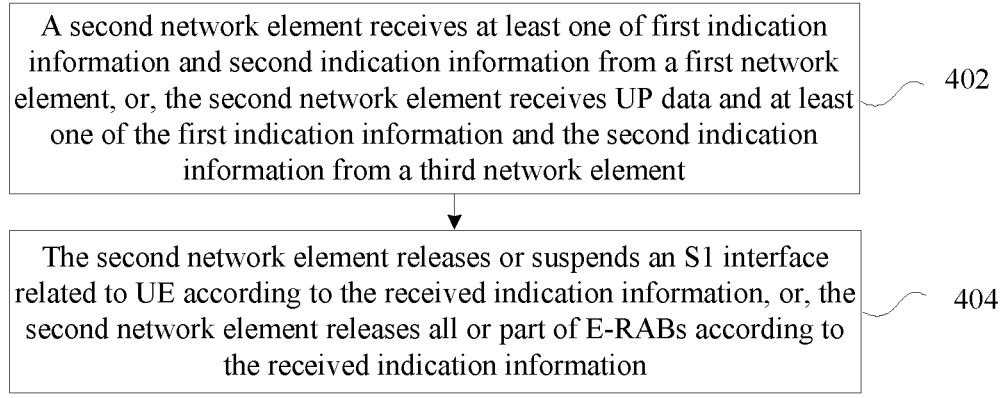
FIG. 4 is a flowchart of another connection control method according to an embodiment of the present disclosure.

The embodiment provides a connection control method. FIG. 4 is a flowchart of another connection control method according to an embodiment of the present disclosure. As shown in FIG. 4, the flow includes the following operations.

In operation 402, a second network element receives at least one of first indication information and second indication information from a first network element, or the second network element receives UP data and at least one of the first indication information and the second indication information from a third network element.

In operation 404, the second network element releases or suspends an S1 interface related to UE according to the received indication information, or the second network element releases all or part of E-RABs according to the received indication information.

In an embodiment, after the operation that the second network element receives the UP data and at least one of the first indication information and the second indication information from the third network element, the connection control method further includes that: the second network element sends the UP data to the UE through an air interface.

In an embodiment, the second network element is in one of the following states: an RRC_IDLE state and an RRC_INACTIVE state.

In an embodiment, the first indication information is used for indicating a data state of the UE to the second network element, and the first indication information includes at least one of an end marker data packet, whether a core has cached DL data of the UE, and whether the core has the cached DL data of the UE in a set time length.

In an embodiment, the first indication information is further used for indicating whether the second network element is allowed to actively initiate S1 connection release or suspension, or whether the second network element is allowed to release all or part of the E-RABs.

In an embodiment, the second indication information is used for indicating whether the second network element is allowed to actively initiate S1 connection release or suspension, or whether the second network element is allowed to release all or part of the E-RABs.

In an embodiment, after the second network element receives the information sent by the first network element or the third network element, the connection control method further includes that: the second network element triggers execution of release or suspension of the S1 interface related to the UE according to at least one of the following conditions: 1) the second network element learns that the UE has no additional UL data and only expects DL acknowledgement data and the second network element completes receiving DL UP data; 2) the second network element learns that the UE has no additional UL data, the second network element receives the DL UP data and the DL UP data indicates that there is no additional DL data; 3) the second network element learns that the UE has no additional UL data and the second network element receives an indication of the first network element or the third network element about that there is no additional DL data; and 4) the second network element learns that the UE has no additional UL data and the second network element receives an indication of the first network element or the third network element about release or suspension of the S1 interface.

In an embodiment, after the operation that the S1 interface related to the UE is released or suspended according to the received indication information, the connection control method includes that: the second network element sends Msg4 used for indicating the UE to the UE to enter or be kept in the RRC_IDLE state or the RRC_INACTIVE state.

In an embodiment, the first network element is an MME, the second network element is an access network, the third network element is a Serving GateWay (S-GW) or a P-GW, and the first network element and the third network element belong to a core.

The embodiment provides a service processing method, which includes two implementation solutions as follows, respectively.

The first solution is as follows.

In a first operation step, a first network element receives a lower-layer PDU sent by UE to enable a lower protocol layer of the first network element to transmit a PDU from a first logical channel and a PDU from a second logical channel to a higher protocol layer of the first network element.

In a second operation step, the higher protocol layer processes the PDU from the first logical channel and acquires or resumes dedicated configuration information of the UE according to ID information in the PDU of the first logical channel.

In a third operation step, the higher protocol layer transmits the dedicated configuration information and the PDU of the second logical channel to the lower protocol layer.

In a fourth operation step, the lower protocol layer processes the PDU of the second logical channel according to the dedicated configuration information and transmits a processing result to the higher protocol layer.

The other solution is as follows.

In a first operation step, the first network element receives the lower-layer PDU sent by the UE to enable the lower protocol layer of the first network element to transmit the PDU from the first logical channel to the higher protocol layer of the first network element and the lower protocol layer to cache the PDU from the second logical channel.

In a second operation step, the higher protocol layer processes the PDU from the first logical channel and acquires or resumes the dedicated configuration information of the UE according to the ID information in the PDU of the first logical channel.

In a third operation step, the higher protocol layer transmits the dedicated configuration information to the lower protocol layer.

In a fourth operation step, the lower protocol layer processes the cached PDU of the second logical channel according to the dedicated configuration information and transmits the processing result to the higher protocol layer.

In an embodiment, the first network element is a base station; the lower protocol layer includes at least one of a physical layer and a Media Access Control (MAC) layer; the higher protocol layer includes at least one of a Radio Link Control (RLC) layer, a Packet Data Convergence Protocol (PDCP) layer and an RRC layer; and the ID information includes at least one of a resume ID of the UE, a Serving-Temporary Mobile Subscriber Identity (S-TMSI) of the UE and a Cell-Radio Network Temporary Identifier (C-RNTI) of the UE.

Through the above descriptions about the implementation modes, those skilled in the art may clearly know that the connection control methods according to the embodiment may be implemented in a manner of combining software and a universal hardware platform and, of course, may also be implemented through hardware, but the former is a preferred implementation mode under many circumstances. Based on such an understanding, the technical solution of the present disclosure substantially or parts making contributions to the related art may be embodied in the form of a software product. The computer software product is stored in a storage medium (for example, a Read Only Memory (ROM)/Random Access Memory (RAM), a magnetic disk and an optical disk), including multiple instructions configured to enable a computer device (which may be a mobile phone, a computer, a server, a network device or the like) to execute the connection control methods in each embodiment of the present disclosure.

Second Embodiment

The embodiment also provides a connection control device and a service processing device, which are configured to implement the above-mentioned embodiment. What has been described will not be elaborated again. For example, term "module" used below may be a combination of software and/or hardware capable of realizing a preset function. Although the devices described in the following embodiment are preferably implemented with software, implementation with hardware or a combination of the software and the hardware is also possible and conceivable.

Figure 5:
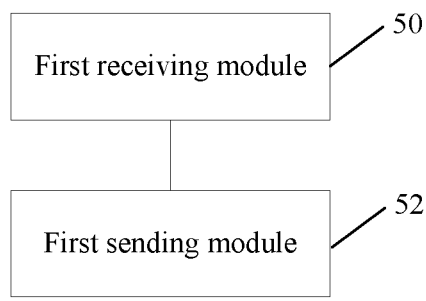
FIG. 5 is a structure block diagram of a connection control device according to an embodiment of the present disclosure.

FIG. 5 is a structure block diagram of a connection control device according to an embodiment of the present disclosure. The device is applied to a first network element, and as shown in FIG. 5, includes:

a first receiving module 50, configured to receive a UL S1 message used for establishing or resuming an S1 interface related to UE from a second network element; and a first sending module 52, configured to send a DL S1 interface to the second network element, where the DL S1 interface includes at least one of first indication information and second indication information.

Figure 6:
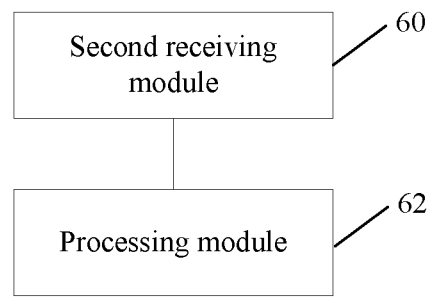
FIG. 6 is a structure block diagram of another connection control device according to an embodiment of the present disclosure.

FIG. 6 is a structure block diagram of another connection control device according to an embodiment of the present disclosure. As shown in FIG. 6, the device includes:

a second receiving module 60, configured to receive at least one of first indication information and second indication information from a first network element or receive UP data and at least one of the first indication information and the second indication information from a third network element; and a processing module 62, configured to release or suspend an S1 interface related to UE according to the received indication information or release all or part of E-RABs according to the received indication information.

In an embodiment, the connection control device further includes a second sending module 64, and the second sending module 64 is configured to send the UP data to the UE through an air interface.

Figure 7:
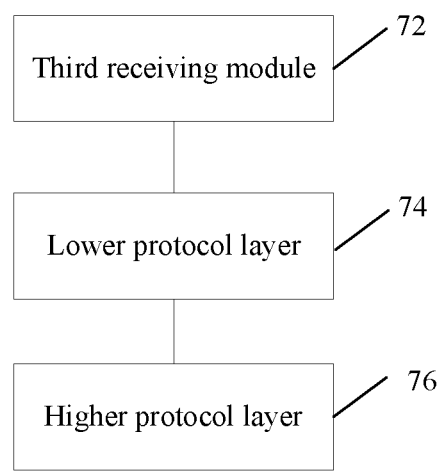
FIG. 7 is a structure block diagram of a service processing device according to an embodiment of the present disclosure.

The embodiment also provides a service processing device, which is applied to a first network element. FIG. 7 is a structure block diagram of a service processing device according to an embodiment of the present disclosure. As shown in FIG. 7, the device includes: a third receiving module 72, configured to receive a lower-layer PDU sent by UE; a lower protocol layer 74 of the first network element, configured to transmit a PDU from a first logical channel and a PDU from a second logical channel to a higher protocol layer 76 of the first network element; and the higher protocol layer 76 of the first network element, configured to process the PDU from the first logical channel, acquire or resume dedicated configuration information of the UE according to ID information in the PDU of the first logical channel and transmit the dedicated configuration information and the PDU of the second logical channel to the lower protocol layer 74, where the lower protocol layer 74 is further configured to process the PDU of the second logical channel according to the dedicated configuration information and transmit a processing result to the higher protocol layer 76.

Or, the service processing device includes: the third receiving module 72, configured to receive the lower-layer PDU sent by the UE; the lower protocol layer 74 of the first network element, configured to transmit the PDU from the first logical channel to the higher protocol layer 76 of the first network element and cache the PDU from the second logical channel; and the higher protocol layer 76, configured to process the PDU from the first logical channel, acquire or resume the dedicated configuration information of the UE according to the ID information in the PDU of the first logical channel and transmit the dedicated configuration information to the lower protocol layer 74, where the lower protocol layer 74 is further configured to process the cached PDU of the second logical channel according to the dedicated configuration information and transmit the processing result to the higher protocol layer 76.

The one or more modules may be implemented through software or hardware and, under the latter condition, may be implemented in, but is not limited to, the following manner: the modules are all positioned in the same processor, or the multiple modules are positioned in different processors in any combination form, respectively.

Third Embodiment

The embodiment is adopted to describe the solutions of the present disclosure in detail. UE may include an indication about whether there is more UL data (the indication is called an "indication 1" hereinafter for short) or include an indication about whether to preferably establish an S1 interface or whether the UE expects a DL acknowledgement of UL data (the indication is called an "indication 2" hereinafter for short) in Msg3. There is also a proposal that an MME may include another indication in a DL S1 interface message to indicate whether the MME has additional DL data to be sent to the UE or indicate whether to switch the UE to an RRC_CONNECTED state (the indication is called an "indication 3" hereinafter for short). An eNB may execute the following operations according to information provided by the indication 1 to the indication 3 on the basis of using a related S1 interface flow as much as possible.

The UE adopts a CP solution, and the UE includes a UL NAS PDU in Msg3 for sending to the eNB. It is believed through present standard discussions that the CP solution does not support segmented data sending, and when UL data to be sent is matched with a UL grant obtained by UE, the UE may adopt an EDT solution and the UE may not indicate that there is more UL data in Msg3 (for example, the indication 1 is not included or the indication 1 has a negative meaning).

Figure 8:
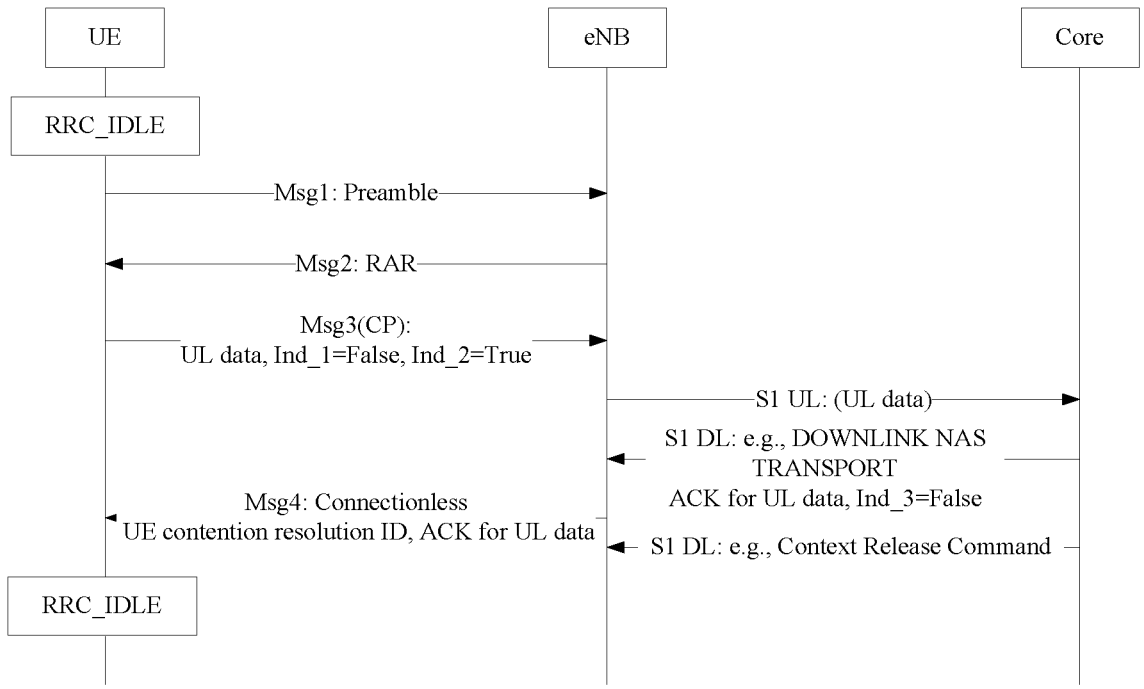
FIG. 8 is a schematic diagram of a first flow according to an embodiment.

A first flow: if the Msg3 includes the indication 2 and the indication 2 indicates to preferably establish the S1 interface or indicates that the UE expects the DL acknowledgement of the UL data, the eNB may not send Msg4 to the UE but trigger an S1 interface flow to send the UL data to a core at first. Subsequently, after the eNB receives a DL S1 interface message (for example, a DL NAS transport message) including a DL NAS PDU, if the MME does not indicate that there is additional DL data (for example, the indication 3 is not included or the indication 3 has a negative meaning), the eNB includes the DL NAS PDU in Msg4 together with a contention resolution ID for sending to the UE, where the Msg4 indicates the UE to be kept in an RRC_IDLE state after contention resolution succeeds. Then, the MME may trigger connection release according to RAI in the UL NAS PDU and the practical condition that there is no additional DL data. FIG. 8 is a schematic diagram of the first flow according to the embodiment.

Figure 9:
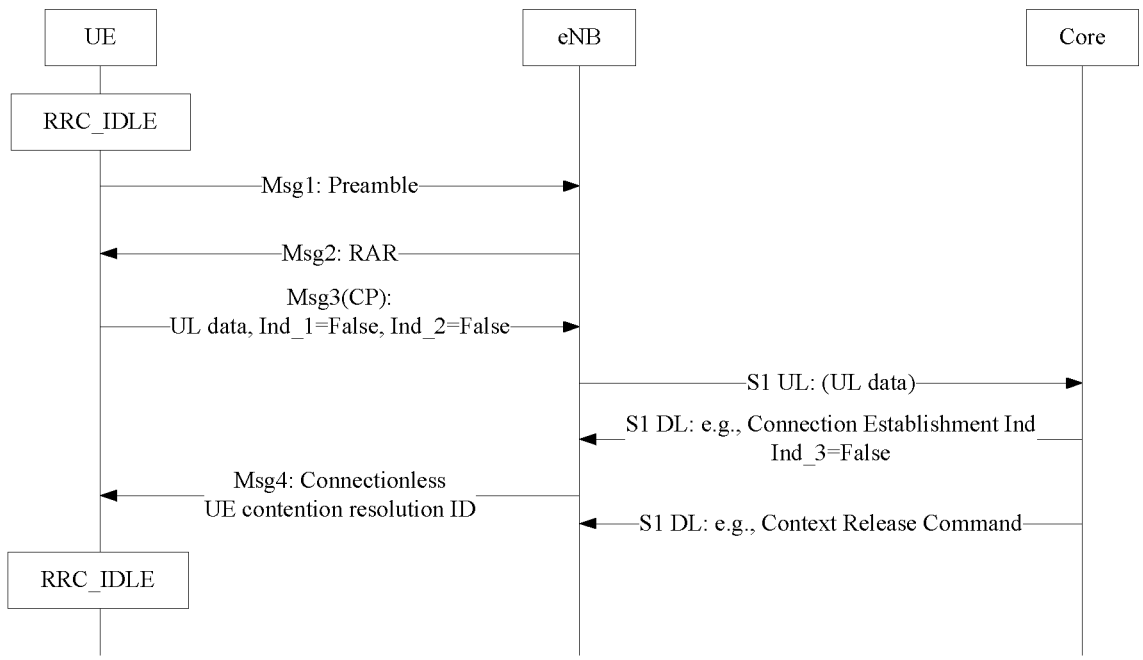
FIG. 9 is a schematic diagram of a second flow according to an embodiment.

A second flow: the Msg3 may not indicate that the UE expects the DL acknowledgement of the UL data (for example, the indication 2 is not included or the indication 2 has a negative meaning), but considering that the MME may cache DL data (according to a Discontinuous Reception (DRX) configuration, the MME has yet not triggered a paging flow), the eNB may still not send the Msg4 to the UE but trigger the S1 interface flow to send the UL data to the core, and if the MME has no cached DL data, the MME may send the DL S1 interface message to the eNB to complete establishment of the S1 interface (for example, a connection establishment indication message), that there is additional DL data being not indicated. The eNB, after receiving the message, sends the Msg4 only including the contention resolution ID to the UE, where the Msg4 indicates the UE to be kept in the RRC_IDLE state after contention resolution succeeds. FIG. 9 is a schematic diagram of the second flow according to the embodiment.

Figure 10:
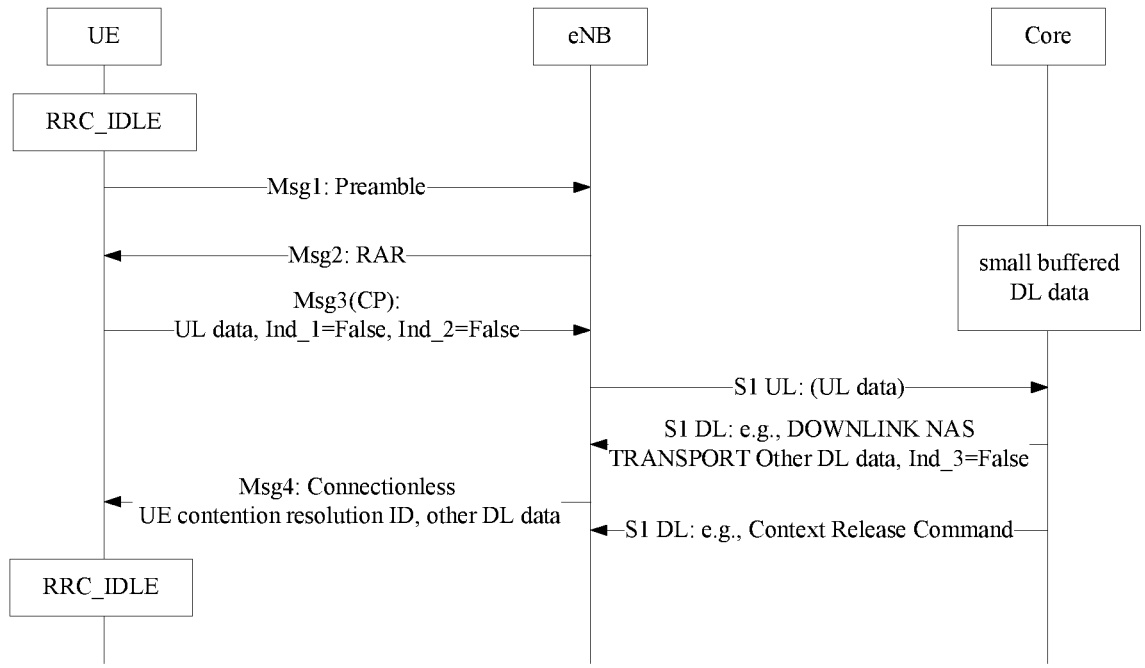
FIG. 10 is a schematic diagram of a third flow according to an embodiment.

A third flow: the Msg3 may not indicate that the UE expects the DL acknowledgement of the UL data, but considering that the MME may cache the DL data (according to the DRX configuration, the MME has yet not triggered the paging flow), the eNB may still not send the Msg4 to the UE but trigger the S1 interface flow to send the UL data to the core at first. If the MME has the cached DL data, the MME may pack the cached data in the DL NAS PDU for sending to the eNB through the DL S1 interface message (for example, the DL NAS transport message), and if all the cached data may be packed in the DL NAS PDU, the MME may not indicate that there is additional DL data in the DL S1 interface message. The eNB, after receiving the message, includes both the DL NAS PDU and the contention resolution ID in the Msg4 for sending to the UE, where the Msg4 indicates the UE to be kept in the RRC_IDLE state after contention resolution succeeds. FIG. 10 is a schematic diagram of the third flow according to the embodiment.

Figure 11:
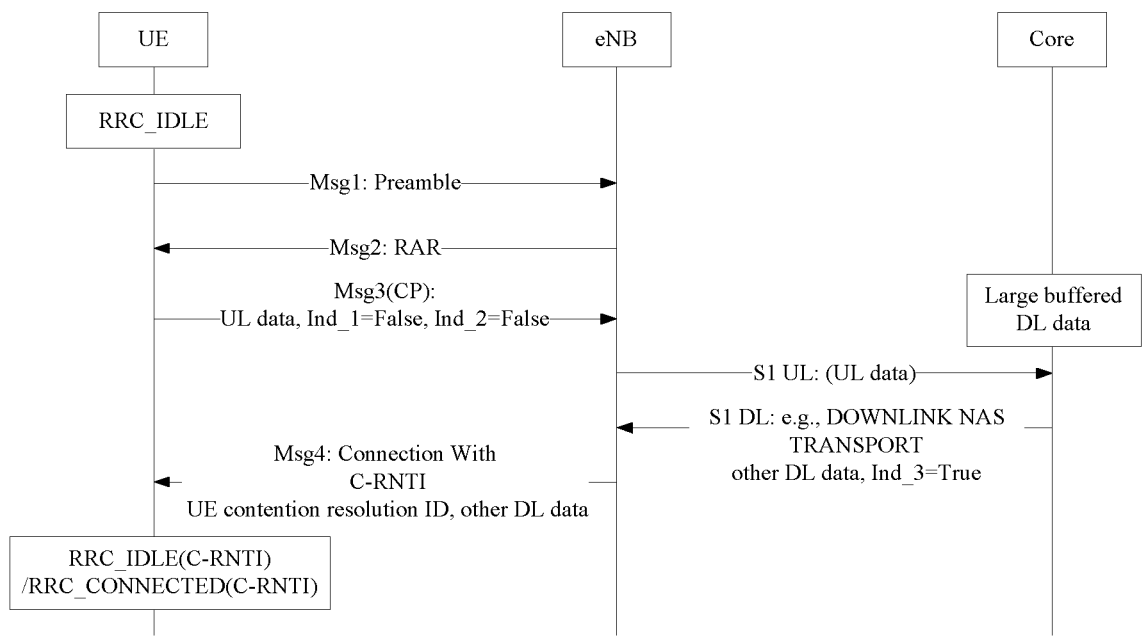
FIG. 11 is a schematic diagram of a fourth flow according to an embodiment.

A fourth flow: the Msg3 may not indicate that the UE expects the DL acknowledgement of the UL data, but considering that the MME may cache the DL data (according to the DRX configuration, the MME has yet not triggered the paging flow), the eNB may still not send the Msg4 to the UE but trigger the S1 interface flow to send the UL data to the core at first. If the MME has the cached DL data, the MME may pack the cached data in the DL NAS PDU for sending to the eNB through the DL S1 interface message (for example, the DL NAS transport message), and if the cached data is of a relatively large size and may not be packed in one DL NAS PDU, the MME may indicate that there is additional DL data in the DL S1 interface message. The eNB, after receiving the message, includes both the DL NAS PDU and the contention resolution ID in the Msg4 for sending to the UE, where the Msg4 indicates the UE to be kept in the RRC_IDLE state but save a C_RNTI or be switched to the RRC_CONNECTED state after contention resolution succeeds. FIG. 11 is a schematic diagram of the fourth flow according to the embodiment.

The UE adopts a UP solution, and the UE multiplexes UL data and an RRC message in the Msg3 for sending to the eNB. It is believed through the present standard discussions that the UP solution may support segmented data sending.

Figure 12:
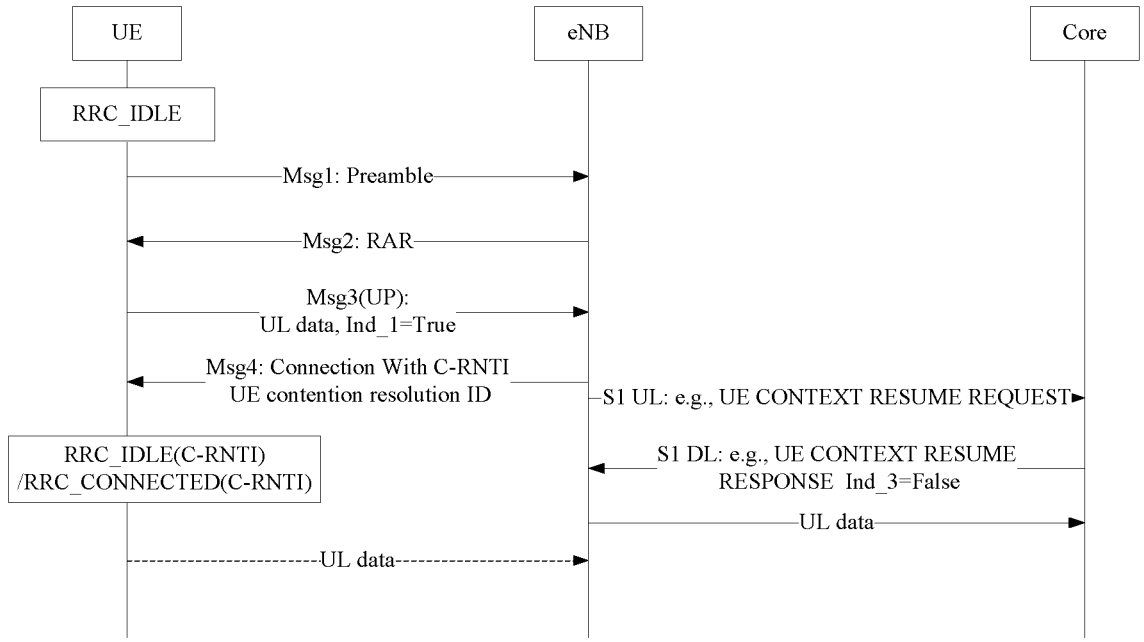
FIG. 12 is a schematic diagram of a fifth flow according to an embodiment.

A fifth flow: if the UL data to be sent is greater than the UL grant obtained by the UE, the UE may simultaneously include the indication 1 in the Msg3 to indicate that there is more UL data to be sent when transmitting the UL data by use of the EDT solution. No matter whether the Msg3 indicates that the UE expects the DL acknowledgement of the UL data, the eNB may send the Msg4 including the contention resolution ID to the UE, where the Msg4 indicates the UE to be kept in the RRC_IDLE state but save the C_RNTI or be switched to the RRC_CONNECTED state after contention resolution succeeds. The eNB may simultaneously trigger the S1 interface flow to send the UL data to the core. FIG. 12 is a schematic diagram of the fifth flow according to the embodiment.

Figure 13:
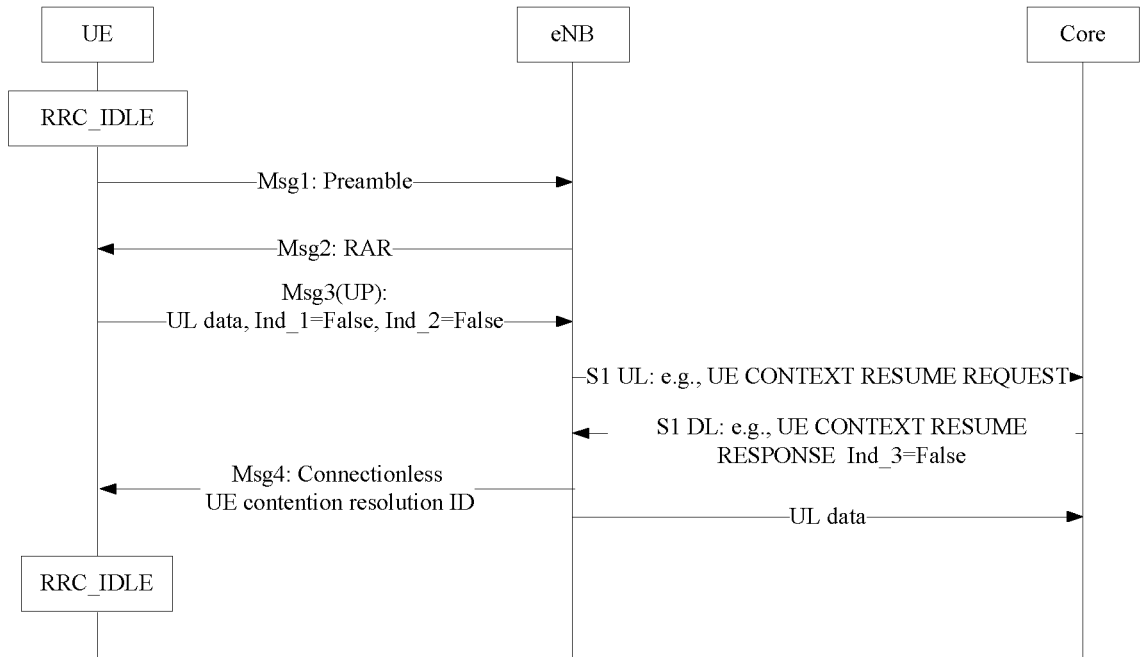
FIG. 13 is a schematic diagram of a sixth flow according to an embodiment.

A sixth flow: if the UL data to be sent is matched with the UL grant obtained by the UE, the UE may completely send the UL data at one time, and in such case, the Msg3 may not indicate that there is more UL data to be sent (for example, the indication 1 is not included or the indication 1 has a negative meaning). The Msg3 may also not indicate that the UE expects the DL acknowledgement of the UL data, but considering that a network side may cache DL data (according to the DRX configuration, the MME has yet not triggered the paging flow), the eNB may not send the Msg4 to the UE but trigger an S1 interface resume flow at first. If the MME may learn that the network side has no cached DL data, the MME may indicate that there is no additional DL data in the DL S1 interface message (for example, a UE context resume response message) (for example, the indication 3 is not included or the indication 3 has a negative meaning). The eNB, after receiving the message, may immediately send the Msg4 only including the contention resolution ID to the UE, where the Msg4 indicates the UE to be kept in the RRC_IDLE state after contention resolution succeeds. FIG. 13 is a schematic diagram of the sixth flow according to the embodiment.

Figure 14:
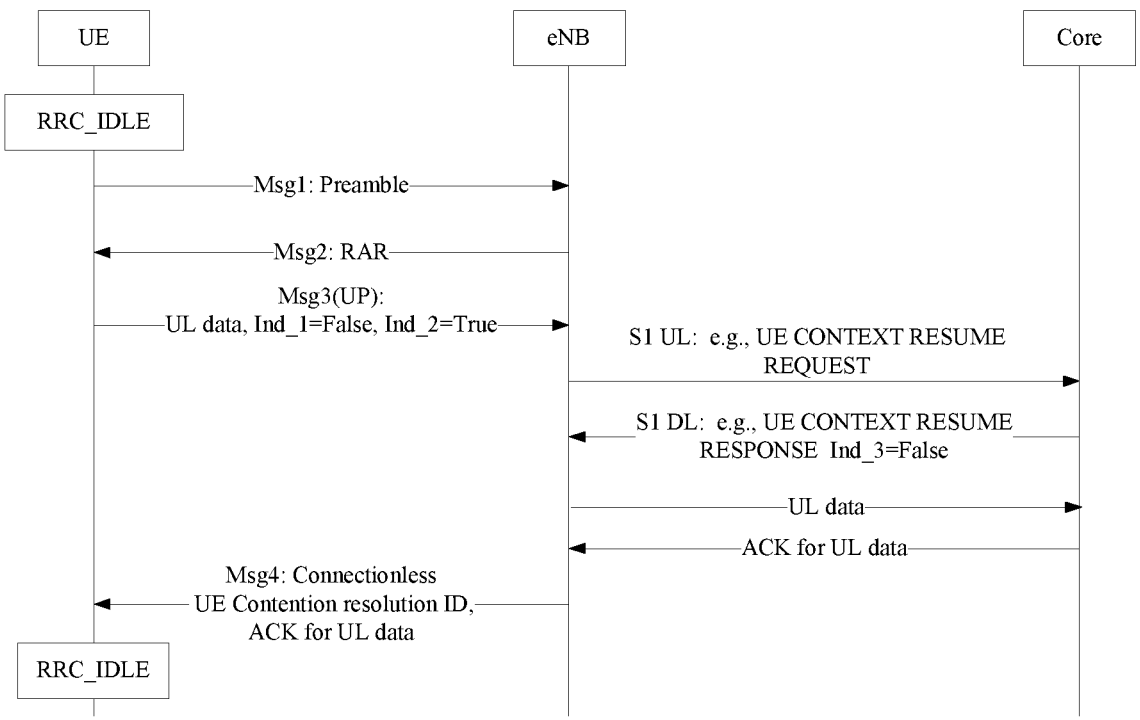
FIG. 14 is a schematic diagram of a seventh flow according to an embodiment.

A seventh flow: if the UL data to be sent is matched with the UL grant obtained by the UE, the UE may completely send the UL data at one time, and in such case, the Msg3 may not indicate that there is more UL data to be sent (for example, the indication 1 is not included or the indication 1 has a negative meaning). If the Msg3 indicates that the UE expects the DL acknowledgement of the UL data, the eNB may not send the Msg4 to the UE but trigger the S1 interface resume flow at first. After the eNB receives the DL S1 interface message (for example, the UE context resume response message), the eNB may keep waiting for the DL acknowledgement of the UL data (i.e., DL data) even though the MME indicates that the network side has no additional DL data in the message. The eNB, after receiving the DL data, may include both the DL data and the contention resolution in the Msg4 and send the Msg4 to the UE, where the Msg4 indicates the UE to be kept in the RRC_IDLE state after contention resolution succeeds. FIG. 14 is a schematic diagram of the seventh flow according to the embodiment.

Figure 15:
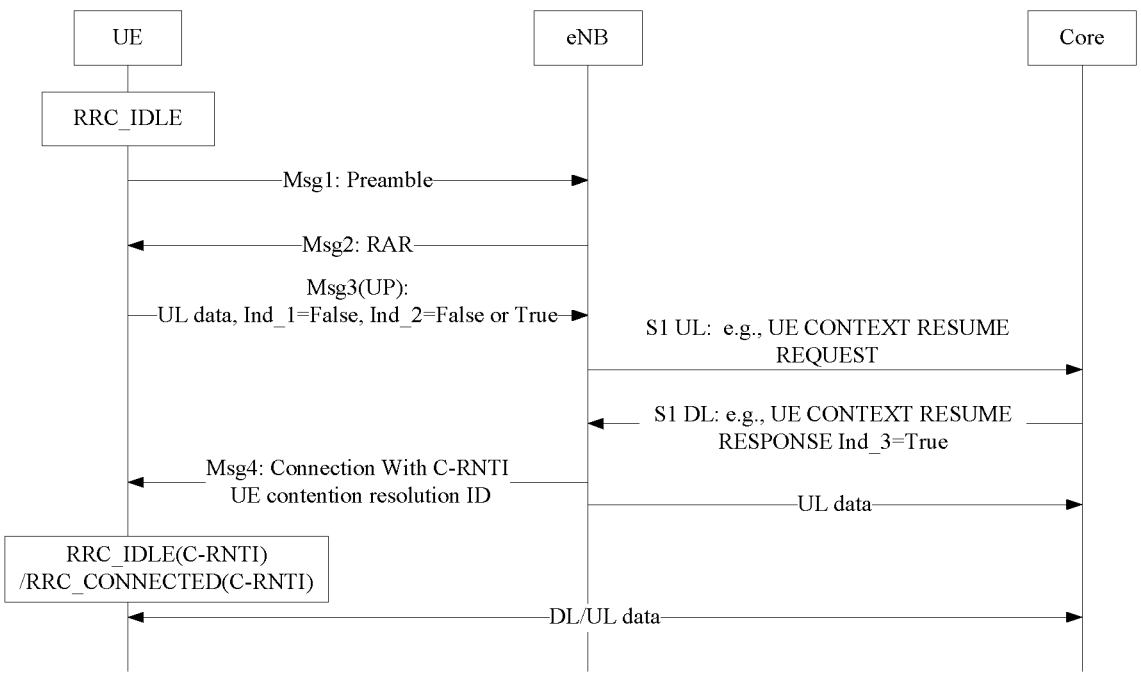
FIG. 15 is a schematic diagram of an eighth flow according to an embodiment.

An eighth flow: if the UL data to be sent is matched with the UL grant obtained by the UE, the UE may completely send the UL data at one time, and in such case, the Msg3 may not indicate that there is more UL data to be sent (for example, the indication 1 is not included or the indication 1 has a negative meaning). No matter whether the Msg3 indicates that the UE expects the DL acknowledgement of the UL data, considering that the network side may cache DL data (according to the DRX configuration, the MME has yet not triggered the paging flow), the eNB may not send the Msg4 to the UE but trigger the S1 interface resume flow at first. If the MME may learn that the network side has the cached DL data, the MME may indicate that there is additional DL data in the DL S1 interface message (for example, the UE context resume response message). The eNB, after receiving the DL S1 interface message, may immediately send the Msg4 including the contention resolution ID to the UE, where the Msg4 indicates the UE to be kept in the RRC_IDLE state but save the C_RNTI or be switched to the RRC_CONNECTED state after contention resolution succeeds. FIG. 15 is a schematic diagram of the eighth flow according to the embodiment.

In the first flow to third flow of the CP solution, it can be seen that the eNB may receive another S1-AP interface message configured to trigger connection release no matter whether the eNB sends the Msg4 after receiving a DL S1-AP interface message. Unlike a legacy flow, in such case, an air interface connection of the UE and the eNB is in the RRC_IDLE state. That is, there is such a condition that the air interface and the S1 interface are in different states, and the eNB, after receiving the connection release message, may judge that an exception occurs because the air interface and S1 interface of the UE are in different states.

In the sixth flow and seventh flow of the UP solution, the problem that the air interface and S1 interface of the UE are in different states also exists, and in such case, it is unlikely to implement UL and DL data interaction and keeping the state of the S1 interface may cause unnecessary resource waste. In addition, in the related flows, release and suspension of the S1 interface are usually triggered by the eNB. For example, the eNB may simultaneously release or suspend the air interface and the S1 interface after a maintained inactivity timer expires. In the above-mentioned flows, the air interface between the eNB and the UE has been in the RRC_IDLE state, so that the eNB may not maintain the inactivity timer of the air interface, and there is no triggering condition for release of the S1 interface for the eNB. In this scenario, a new opportunity or triggering condition for release or suspension of the S1 interface is considered.

For solving the problem of the inconsistent air interface and S1 interface connections in the above-mentioned solutions, the following solution is proposed in the embodiment.

In the UP solution, if the MME, after receiving a UL S1 interface including data and used for establishing or resuming the S1 interface related to the UE, judges that the core has no cached DL data and the like, the MME may indicate the S1 interface related to the UE to be released or suspended, and the eNB may subsequently initiate an S1 interface suspension flow actively.

In an embodiment, the MME may include a release indication in a DL S1 interface responding to the UL S1 interface establishment or a resume message to indicate that the eNB is allowed to initiate S1 connection suspension or E-RAB release.

In an embodiment, a connection control method for a base station side is provided, which includes the following contents.

In the UP solution, a base station, when executing an establishment or resume of an S1 interface related to UE, receives an indication of an MME and only triggers an S1 interface release or suspension flow according to the indication of the MME.

In an embodiment, the base station triggers release or suspension of the S1 interface when at least one of the following conditions occurs:

1) the base station learns that the UE has no additional UL data and only expects DL acknowledgement data, and the base station has received DL UP data;

2) the base station learns that the UE has no additional UL data, the base station receives the DL UP data, and the data indicates that there is no additional DL data;

3) the base station learns that the UE has no additional UL data, and the base station receives an indication of the MME about that there is no additional DL data; and 4) the base station learns that the UE has no additional UL data, and the base station receives an indication of the MME about release or suspension of the S1 interface.

The embodiment also includes the following examples.

1) If the DL S1 interface message sent by the MME and configured to respond to the UL S1 interface establishment or a resume message indicates the S1 interface to be released (for example, the DL S1 interface message includes the release indication or the DL S1 interface message is a release command), the eNB sends the Msg4 indicating the UE to be kept in the RRC_IDLE state to the UE.

2) If the DL S1 interface message sent by the MME and configured to respond to the UL S1 interface establishment or a resume message indicates the S1 interface to be established or resumed, the eNB sends the Msg4 indicating the UE to be switched to the RRC_IDLE state with the C_RNTI saved or be switched to the RRC_CONNECTED state to the UE.

Fourth Embodiment

Figure 16:
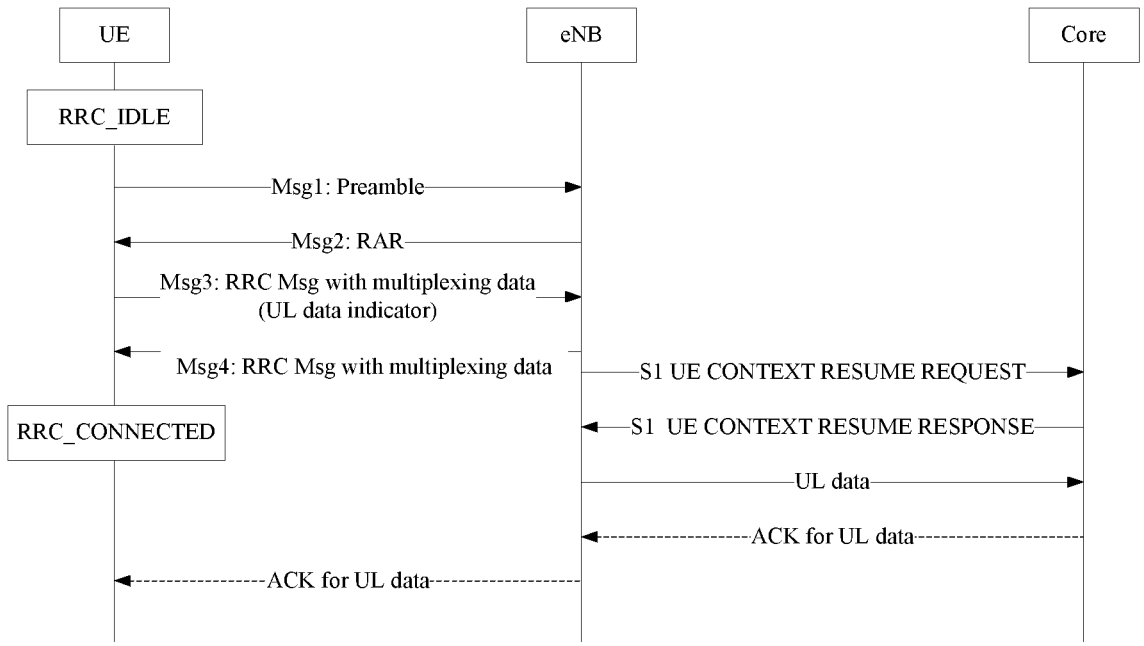
FIG. 16 is a schematic diagram of a ninth flow according to an embodiment.
Figure 17:
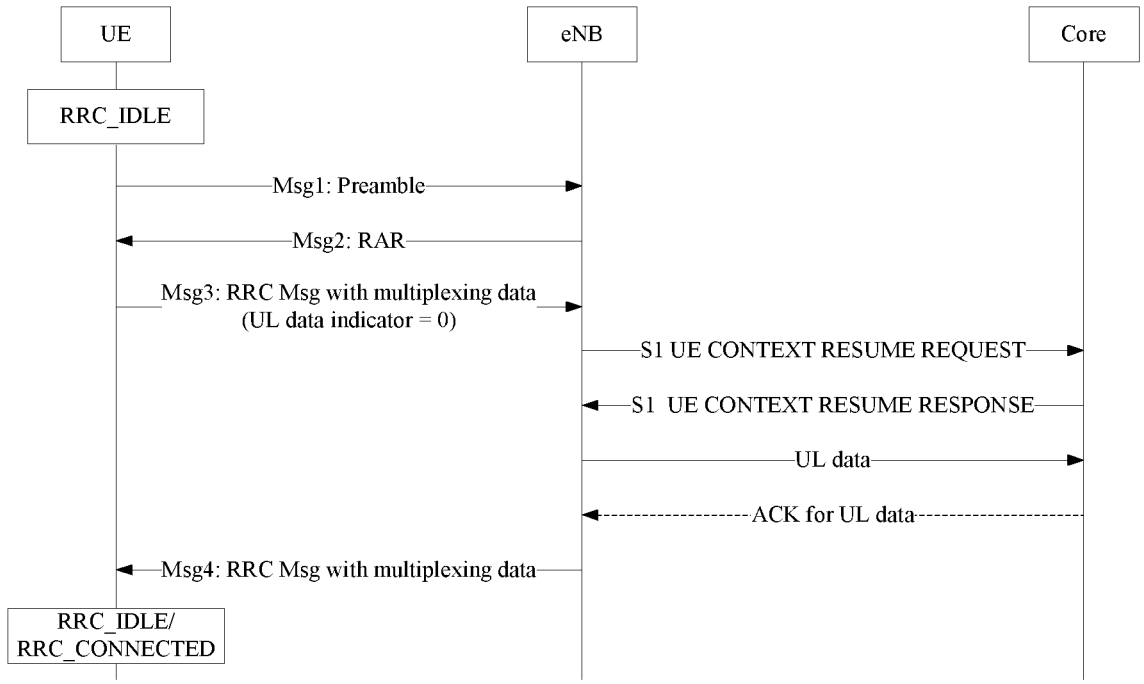
FIG. 17 is a schematic diagram of a tenth flow according to an embodiment.

FIG. 16 is a schematic diagram of a ninth flow according to an embodiment. FIG. 17 is a schematic diagram of a tenth flow according to an embodiment. Each shows a complete example of the embodiment. In FIG. 16, a base station, after receiving UL Msg3 containing indication information (a UL data indication), directly sends Msg4 to UE, and the UE, after receiving the Msg4, is switched to a connected state. In FIG. 17, Msg3 does not contain any UL indication information.

Fifth Embodiment

In a UP solution, a first network element receives Msg3 sent by UE, and multiple MAC Service Data Units (SDUs) of an RRC message of a Common Control Channel (CCCH) and user data of a Dedicated Traffic Channel (DTCH) are multiplexed in the Msg3. The first network element parses the MAC SDUs from the CCCH at first. However, since the first network element has yet not acquired a resume ID of the UE at this moment, the first network element may not parse the MAC SDUs from the DTCH.

The first network element may adopt the following operations.

1) A MAC layer of the first network element transmits the MAC SDUs from the CCCH and the MAC SDUs from the DTCH to a higher layer together;

the higher layer, after processing the MAC SDUs from the CCCH and acquiring the resume ID of the UE, resumes a context and logical channel configuration of the UE; and the higher layer sends logical channel configuration information and the MAC SDUs of the DTCH to the MAC layer, and the MAC layer may correctly process the MAC SDUs of the DTCH and correctly send them to the higher layer.

Or, 2) the MAC layer of the first network element only transmits the MAC SDUs from the CCCH to the higher layer and caches the MAC SDUs from the DTCH;

the higher layer, after processing the MAC SDUs from the CCCH and acquiring the resume ID of the UE, resumes the context and logical channel configuration of the UE; and the higher layer sends the logical channel configuration information to the MAC layer, and the MAC layer processes the cached MAC SDUs of the DTCH according to the configuration information and sends them to the higher layer.

Sixth Embodiment

Figure 18:
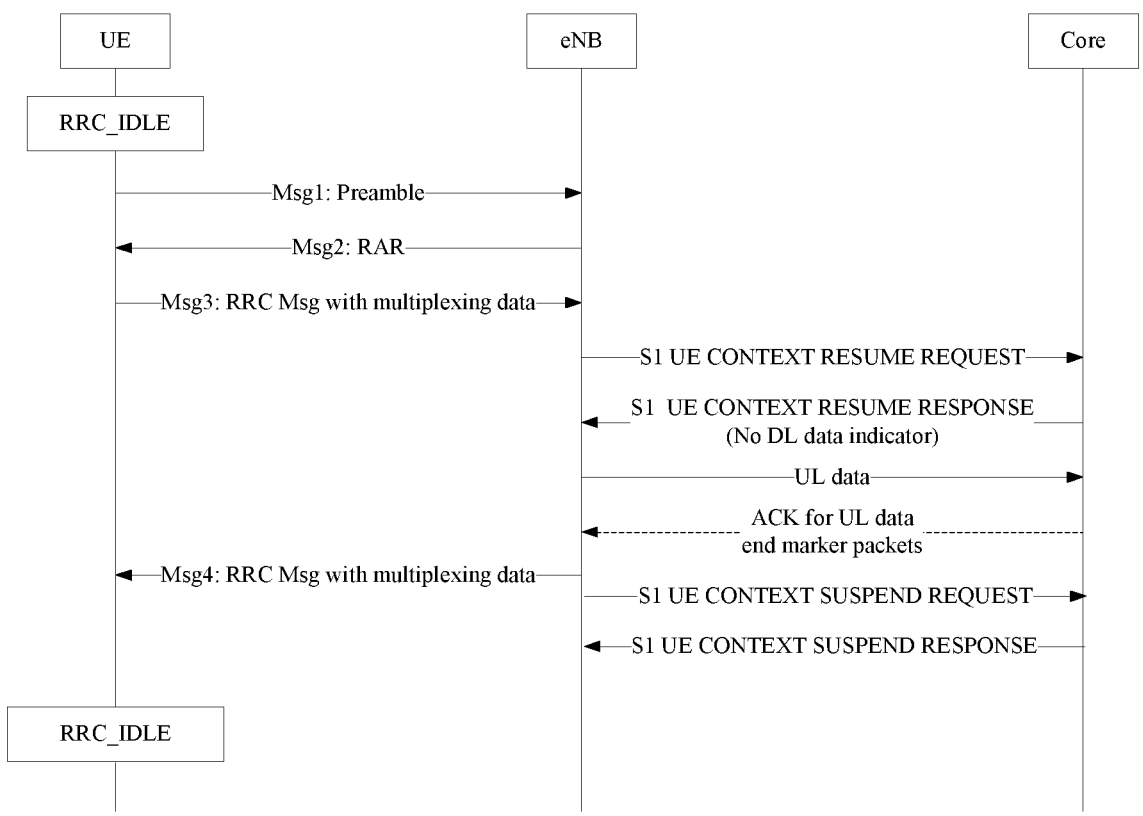
FIG. 18 is a schematic diagram of an eleventh flow according to an embodiment.

FIG. 18 is a schematic diagram of an eleventh flow according to an embodiment. Corresponding to the solution of FIG. 4 in the embodiment, a second network element (e.g., eNB) may receive indication information of a first network element and/or third network element in a core.

Seventh Embodiment

The embodiment of the present disclosure also provides a storage medium, which includes a stored program, the program, when running, executes any above-mentioned method.

In an embodiment, the storage medium may be configured to store a program code configured to execute the following operations.

In a first step, a UL S1 message used for establishing or resuming an S1 interface related to UE is received from a second network element.

In a second step, a DL S1 interface is sent to the second network element, where the DL S1 interface includes at least one of first indication information and second indication information.

In an embodiment, the storage medium may include, but is not limited to, various medium capable of storing program codes such as a Universal Serial Bus (USB) flash disk, a ROM, a RAM, a mobile hard disk, a magnetic disk or an optical disk.

The embodiment of the present disclosure also provides a processor, which is configured to run a program, the program, when running, executes the operations in any above-mentioned method.

In an embodiment, the program is configured to execute the following operations.

In a first step, a UL S1 message used for establishing or resuming an S1 interface related to UE is received from a second network element.

In a second step, a DL S1 interface is sent to the second network element, where the DL S1 interface includes at least one of first indication information and second indication information.

In an embodiment, examples in the embodiment may refer to the examples described in the above-mentioned embodiments and implementation modes and will not be elaborated in the embodiment.

It is apparent that those skilled in the art should know that at least one module or at least one operation of the present disclosure may be implemented through a universal computing device. They may be concentrated in a single computing device or distributed in a network formed by multiple computing devices. In an embodiment, they may be implemented by program codes executable for the computing devices and thus may be stored in a storage device for execution with the computing devices. Moreover, in some cases, the shown or described operations may be executed in sequences different from those described here, or may form one or more integrated circuit modules respectively, or multiple modules or operations therein may form a single integrated circuit module for implementation. Therefore, the present disclosure is not limited to any specific hardware and software combination.

What is claimed is:

1. A connection control method, comprising:
   receiving, by a first network element, an Up Link (UL) S1 message used for establishing or resuming an S1 interface related to User Equipment (UE) from a second network element; and
   sending, by the first network element, a Downlink (DL) S1 message to the second network element, the DL S1 message comprising at least one of first indication information and second indication information;
   wherein the first network element is a Mobility Management Entity (MME), and the second network element is an access network;
   wherein the DL S1 message is configured to indicate the S1 interface related to the UE to be released or suspended.

2. The method as claimed in claim 1, wherein the second network element is in one of the following states: a Radio Resource Control_IDLE (RRC_IDLE) state and a Radio Resource Control_INACTIVE (RRC_INACTIVE) state.

3. The method as claimed in claim 1, wherein the first indication information is used for indicating a data state of the UE to the second network element, and the first indication information comprises at least one of:
   an end marker data packet,
   whether a core has cached DL data of the UE, and
   whether the core has the cached DL data of the UE in a set time length.

4. The method as claimed in claim 1, wherein the first indication information is used for indicating whether the second network element is allowed to actively initiate S1 connection release or suspension or whether the second network element is allowed to release all or part of Evolved Radio Access Bearers (E-RABs).

5. The method as claimed in claim 1, wherein the second indication information is used for indicating whether the second network element is allowed to actively initiate S1 connection release or suspension or whether the second network element is allowed to release all or part of Evolved Radio Access Bearers (E-RABs).

6. The method as claimed in claim 1, wherein the DL S1 message comprises related information of the S1 interface, and the related information of the S1 interface comprises an S1 interface Identification (ID) of the UE on a first network element side and an S1 interface ID of the UE on a second network element side.

7. The method as claimed in claim 1, wherein the first indication information comprises a waiting timer, and the first indication information is used for indicating the second network element to release or suspend the S1 interface related to the UE after the first indication information is received and a set time length of the waiting timer is exceeded.

8. A non-transitory computer-readable storage medium, comprising a stored program, the program running to execute the methods as claimed in claim 1.

9. A processor, configured to run a program, the program, when running, executes the methods as claimed in claim 1.

10. A connection control method, comprising:
    receiving, by a second network element, a Downlink (DL) S1 message from a first network element, the DL S1 message comprising at least one of first indication information and second indication information, or, receiving, by the second network element, User Plane (UP) data and the DL S1 message from a third network element, the DL S1 message comprising at least one of the first indication information and the second indication information; and
    releasing or suspending, by the second network element, an S1 interface related to User Equipment (UE) according to the received indication information, or, releasing, by the second network element, all or part of Evolved Radio Access Bearers (E-RABs) according to the received indication information;
    when the DL S1 message sent by the first network element and configured to respond to a Up Link (UL) S1 interface establishment or a resume message indicates the S1 interface to be released, the second network element sends a Msg4 indicating the UE to be kept in a Radio Resource Control_IDLE (RRC_IDLE) state to the UE;
    when the DL S1 message sent by the first network element and configured to respond to the UL S1 interface establishment or a resume message indicates the S1 interface to be established or resumed, the second network element sends the Msg4 indicating the UE to be switched to the RRC_IDLE state with a Cell-Radio Network Temporary Identifier (C_RNTI) saved or be switched to a Radio Resource Control_CONNECTED (RRC_CONNECTED) state to the UE;
    wherein the first network element is a Mobility Management Entity (MME), and the second network element is an access network.

11. The method as claimed in claim 10, after receiving, by the second network element, the UP data and the DL S1 message from the third network element, further comprising:
    sending, by the second network element, the UP data to the UE through an air interface.

12. The method as claimed in claim 11, after receiving, by the second network element, the indication information sent by the first network element or the third network element, further comprising:
    triggering, by the second network element, execution of release or suspension of the S1 interface related to the UE according to at least one of the following conditions:
    the second network element learns that the UE has no additional UL data and only expects DL acknowledgement data and the second network element completes receiving DL UP data;
    the second network element learns that the UE has no additional UL data, the second network element receives the DL UP data, and the DL UP data indicates that there is no additional DL data;

the second network element learns that the UE has no additional UL data and the second network element receives an indication of the first network element or the third network element about that there is no additional DL data; and the second network element learns that the UE has no additional UL data and the second network element receives an indication of the first network element or the third network element about release or suspension of the S1 interface.

13. The method as claimed in claim 10, wherein the second network element is in one of the following states: the RRC_IDLE state and a Radio Resource Control_INACTIVE (RRC_INACTIVE) state.

14. The method as claimed in claim 10, wherein the first indication information is used for indicating a data state of the UE to the second network element, and the first indication information comprises at least one of:
an end marker data packet,
whether a core has cached DL data of the UE, and
whether the core has the cached DL data of the UE in a set time length.

15. The method as claimed in claim 10, wherein the first indication information is used for indicating whether the second network element is allowed to actively initiate S1 connection release or suspension or whether the second network element is allowed to release all or part of the E-RABs.

16. The method as claimed in claim 10, wherein the second indication information is used for indicating whether the second network element is allowed to actively initiate S1 connection release or suspension or whether the second network element is allowed to release all or part of the E-RABs.

17. The method as claimed in claim 10, after releasing or suspending the S1 interface related to the UE according to the received indication information, further comprising:
sending, by the second network element, Msg4 used for indicating the UE to enter or be kept in the RRC_IDLE state or a Radio Resource Control_INACTIVE (RRC_INACTIVE) state to the UE.

18. A non-transitory computer-readable storage medium, comprising a stored program, the program running to execute the methods as claimed in claim 10.

19. A service processing method, comprising:
receiving, by a first network element, a lower-layer Protocol Data Unit (PDU) sent by User Equipment (UE) to enable a lower protocol layer of the first network element to transmit a PDU from a first logical channel and a PDU from a second logical channel to a higher protocol layer of the first network element,
by the higher protocol layer, processing the PDU from the first logical channel and acquiring or resuming dedicated configuration information of the UE according to Identification (ID) information in the PDU of the first logical channel, transmitting, by the higher protocol layer, the dedicated configuration information and the PDU of the second logical channel to the lower protocol layer, and by the lower protocol layer, processing the PDU of the second logical channel according to the dedicated configuration information and transmitting a processing result to the higher protocol layer;

or, receiving, by the first network element, the lower-layer PDU sent by the UE to enable the lower protocol layer of the first network element to transmit the PDU from the first logical channel to the higher protocol layer of the first network element and the lower protocol layer to cache the PDU from the second logical channel, by the higher protocol layer, processing the PDU from the first logical channel and acquiring or resuming the dedicated configuration information of the UE according to the ID information in the PDU of the first logical channel, transmitting, by the higher protocol layer, the dedicated configuration information to the lower protocol layer, and by the lower protocol layer, processing the cached PDU of the second logical channel according to the dedicated configuration information and transmitting the processing result to the higher protocol layer;

wherein when a Downlink (DL) S1 message sent by a Mobility Management Entity (MME) and configured to respond to a Up Link (UL) S1 interface establishment or a resume message indicates an S1 interface to be released, a base station sends a Msg4 indicating the UE to be kept in a Radio Resource Control_IDLE (RRC_IDLE) state to the UE;

when the DL S1 message sent by the MME and configured to respond to the UL S1 interface establishment or a resume message indicates the S1 interface to be established or resumed, the base station sends the Msg4 indicating the UE to be switched to the RRC_IDLE state with a Cell-Radio Network Temporary Identifier (C_RNTI) saved or be switched to a Radio Resource Control_CONNECTED (RRC_CONNECTED) state to the UE;

wherein the first network element is the base station.

20. The method as claimed in claim 19, wherein the first network element is a base station; the lower protocol layer comprises at least one of a physical layer and a Media Access Control (MAC) layer; the higher protocol layer comprises at least one of a Radio Link Control (RLC) layer, a Packet Data Convergence Protocol (PDCP) layer and a Radio Resource Control (RRC) layer; and the ID information comprises at least one of a resume ID of the UE, a Serving-Temporary Mobile Subscriber Identity (S-TMSI) of the UE and the C_RNTI of the UE.

* * * * *